(12) United States Patent
Hall et al.

(10) Patent No.: US 10,677,388 B2
(45) Date of Patent: Jun. 9, 2020

(54) OVERHEAD MOUNTING SYSTEM AND ATTACHMENTS

(71) Applicants: David R. Hall, Provo, UT (US); Jerome Miles, Spanish Fork, UT (US); Casey Webb, Spanish Fork, UT (US); Daniel Madsen, Vineyard, UT (US)

(72) Inventors: David R. Hall, Provo, UT (US); Jerome Miles, Spanish Fork, UT (US); Casey Webb, Spanish Fork, UT (US); Daniel Madsen, Vineyard, UT (US)

(73) Assignee: Hall Labs LLC, Provo, UT (US)

( * ) Notice: Subject to any disclaimer, the term of this patent is extended or adjusted under 35 U.S.C. 154(b) by 90 days.

(21) Appl. No.: 15/916,573

(22) Filed: Mar. 9, 2018

(65) Prior Publication Data
US 2018/0299064 A1    Oct. 18, 2018

Related U.S. Application Data

(63) Continuation-in-part of application No. 15/487,999, filed on Apr. 14, 2017, now Pat. No. 9,939,105.

(51) Int. Cl.
| | |
|---|---|
| *F16M 13/02* | (2006.01) |
| *F16M 13/04* | (2006.01) |
| *H02G 3/06* | (2006.01) |
| *F16B 1/00* | (2006.01) |
| *H02G 3/04* | (2006.01) |
| *A47B 96/02* | (2006.01) |

(52) U.S. Cl.
CPC ............. *F16M 13/027* (2013.01); *F16B 1/00* (2013.01); *F16M 13/04* (2013.01); *H02G 3/045* (2013.01); *H02G 3/0418* (2013.01); *H02G 3/0608* (2013.01); *A47B 96/024* (2013.01); *F16B 2001/0035* (2013.01); *F16M 2200/02* (2013.01); *F16M 2200/048* (2013.01); *F16M 2200/08* (2013.01)

(58) Field of Classification Search
CPC .. F16M 13/027; F16M 13/04; F16M 2200/02; F16M 2200/048; F16M 2200/08; F16B 1/00; F16B 2001/0035; H02G 3/0418; H02G 3/045; H02G 3/0608; A47B 96/024
See application file for complete search history.

(56) References Cited

U.S. PATENT DOCUMENTS

| | | | | |
|---|---|---|---|---|
| 2,867,681 A | * | 1/1959 | Leopold | H02G 3/045 174/101 |
| 5,118,069 A | * | 6/1992 | Muhlethaler | E04B 9/18 248/613 |
| 5,402,979 A | * | 4/1995 | Bellamy | B60R 11/00 182/127 |
| 5,927,041 A | * | 7/1999 | Sedlmeier | E04B 9/064 248/49 |
| 6,158,066 A | * | 12/2000 | Brown | E03C 1/021 4/695 |

(Continued)

*Primary Examiner* — Anita M King

(57) ABSTRACT

An overhead mounting system is disclosed. The mounting system includes an overhead channel with a plurality of openings in the base for attaching to a surface, such as a ceiling or trusses, along with a plurality of openings in the channel walls for securing components. The system is configured to accommodate attachment for multiple and diverse components, which have different dimensions, masses, pulling forces, or power requirements.

16 Claims, 17 Drawing Sheets

(56) References Cited

U.S. PATENT DOCUMENTS

| | | | | |
|---|---|---|---|---|
| 6,519,791 B2* | 2/2003 | Randolph | ............... | E03C 1/021 |
| | | | | 4/695 |
| 7,604,131 B1* | 10/2009 | Clark | ....................... | B62H 3/12 |
| | | | | 211/118 |
| 7,762,042 B2* | 7/2010 | Packard, III | ......... | H02G 3/0608 |
| | | | | 174/68.1 |
| 8,714,495 B2* | 5/2014 | Myers | ....................... | F16B 2/12 |
| | | | | 248/74.1 |
| 10,113,690 B1* | 10/2018 | Hall | ..................... | F16M 13/027 |
| 2002/0043040 A1* | 4/2002 | Cherry | ................ | E04B 2/7453 |
| | | | | 52/702 |
| 2018/0352663 A1* | 12/2018 | Hall | ....................... | H02G 11/02 |
| 2019/0210675 A1* | 7/2019 | Clark | ..................... | B62H 5/003 |

* cited by examiner

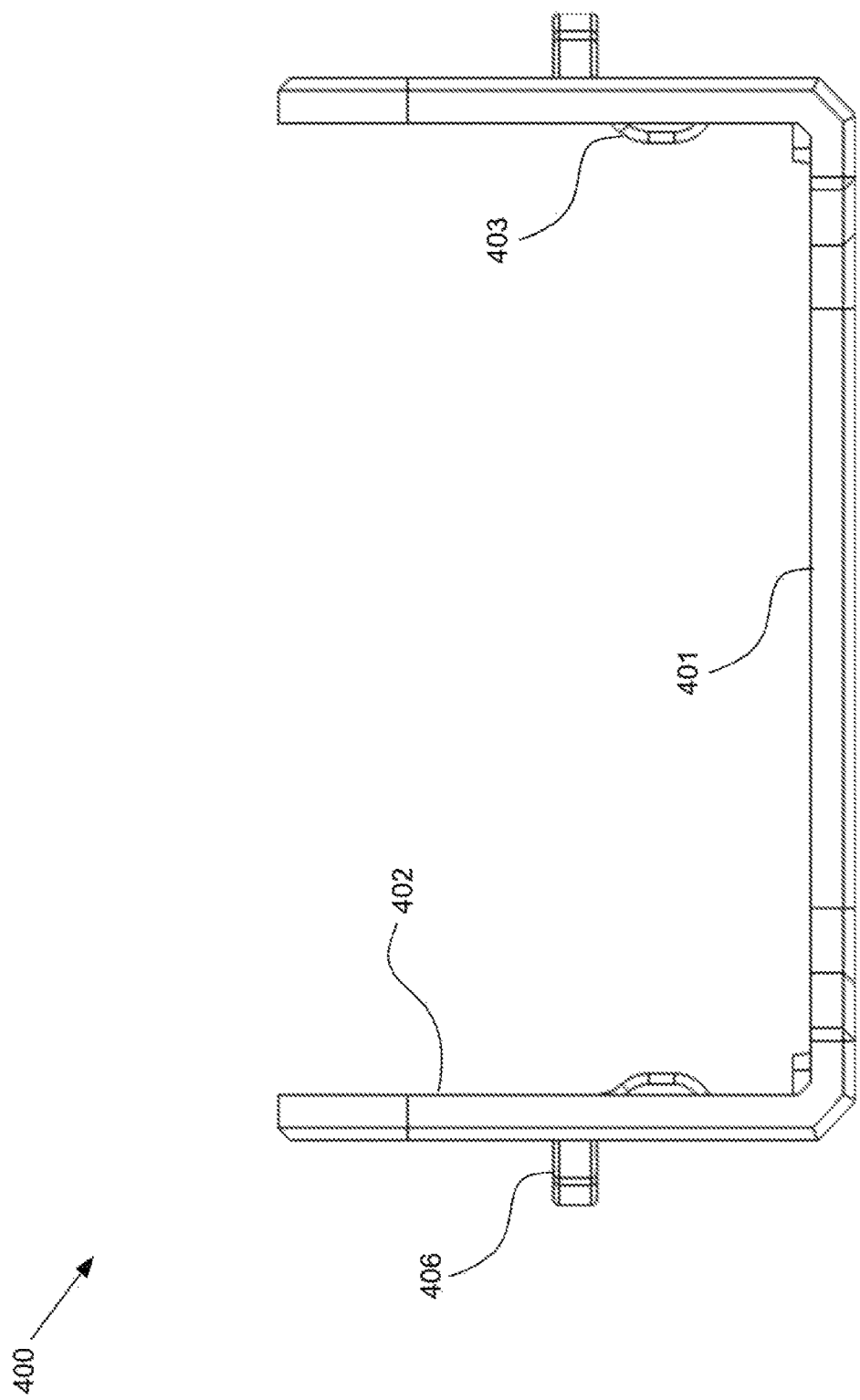

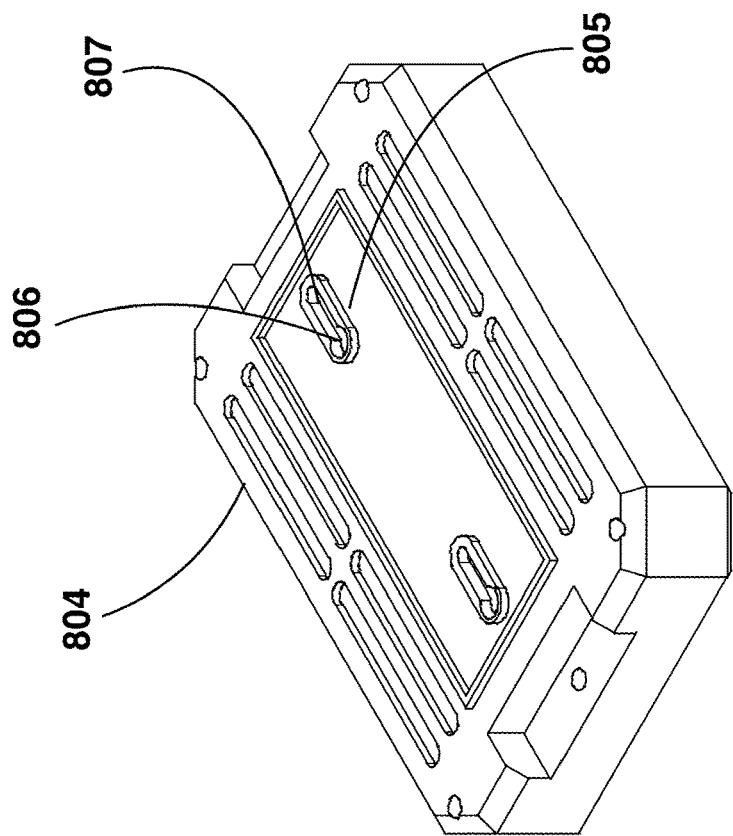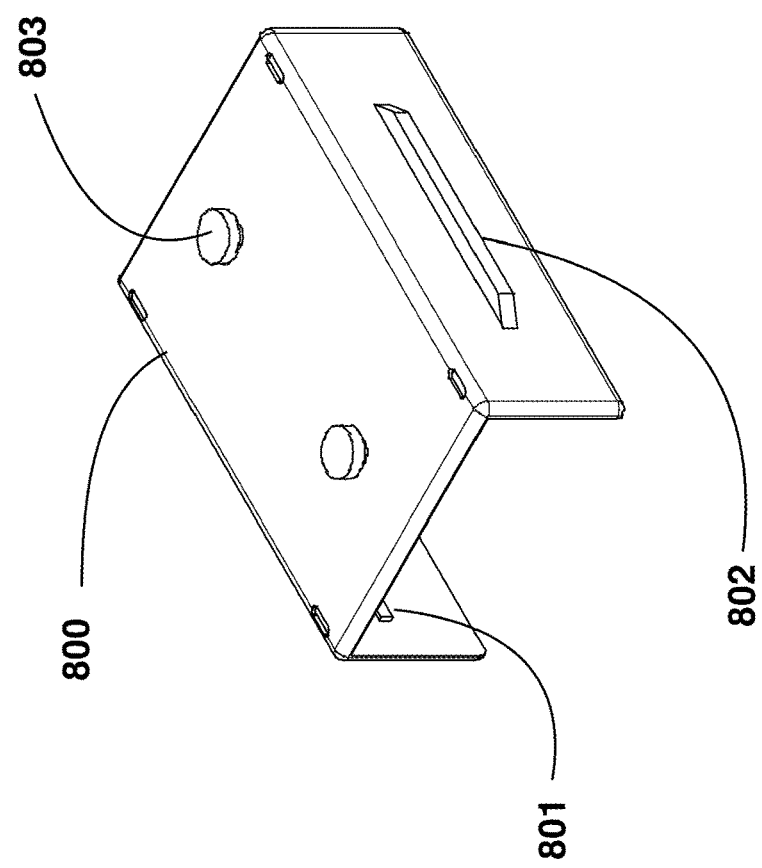
FIG. 8

OVERHEAD MOUNTING SYSTEM AND ATTACHMENTS

CROSS-REFERENCE TO RELATED APPLICATIONS

This application is a continuation in part of U.S. patent application Ser. No. 15/487,999 by David Hall et al., filed Apr. 14, 2017 and entitled "Overhead Mounting System."

TECHNICAL FIELD

This invention relates generally to the field of garage organization and overhead mounting systems.

BACKGROUND

Garage organization is, for some, a difficulty of home ownership. The struggle to organize multiple tools and other items of greatly varying shapes and sizes has led to innovations is garage storage systems. Many systems are based on the concept of creating an overhead floor or extended shelf on which to store things. This overhead floor or extended shelf is often convenient for items that are not frequently used, but is inadequate for items that are frequently accessed, especially for tools. Tools are generally stored in convenient, ground-based boxes or cabinets. These boxes, drawers, or cabinets create inconveniences for power tools that are regularly used; opening the drawer or cabinet, then finding the power outlet, plugging the power tool in, then turning the power tool on and using it, finally when finished with the power tool it needs to be unplugged and placed back in the drawer. Instead of storing power tools on the ground or on a work bench, it is preferable to store them in out of the way locations while still having easy access to the tools. This is especially true of tools such as power cords, lights, compact lifters and many others. The increased prevalence of smart devices and remote control of many devices amplifies the need to find out-of-the-way storage with easy access. There is, therefore, room for improvement in garage organization solutions.

SUMMARY

In a first aspect, the disclosure provides a system for mounting devices and tools overhead. Overhead mounting systems are described herein that address at least some of the problems mentioned in the Background. One embodiment includes a U-shaped channel, which includes a channel base, at least two channel walls, and at least two channel ends. The channel walls are connected perpendicularly to the channel base. The channel base includes a plurality of channel base openings. The channel walls each comprise a plurality of channel wall openings spaced from each other by a channel wall inter-opening length. One or more of the channel wall openings are spaced from at least one of the channel ends by half the channel wall inter-opening length.

The U-shaped cover includes a cover base, at least two cover walls, and at least two cover ends. The cover walls are connected perpendicularly to the cover base. The cover walls each include one or more inward protrusions. At least one of the one or more inward protrusions is spaced from at least one of the cover ends by half the channel wall opening length. In one embodiment, the cover ends are concaved along the cover base such that a cover base length is less than a cover wall length. In one embodiment the cover ends are concaved along one or more of the cover walls such that the cover wall length is less than the cover base length. In one embodiment the cover ends are concaved along the cover base and along one or more of the cover walls.

The cover spacer includes a flange and a spacer base. The spacer base includes a shape complementary to the cover end concavity. The U-shaped channel has an exterior width less than or equal to a U-shaped cover interior width extending between the cover walls. The U-shaped channel exterior width is greater than a width across the U-shaped cover between at least two laterally-aligned inward protrusions.

In a second aspect, the disclosure provides, a means for attaching lightweight objects to the channel. There are many different types of tools or accessories where it would be useful to have them mounted overhead and primarily out of the way, some of these objects will be lightweight and do not require an attachment that will withstand high pulling forces. These lightweight objects are attached to the channel by molded brackets with protrusions that fit into corresponding openings in the channel. Some of the lightweight objects are attached to brackets that can remain attached to the channel while the lightweight object is removed from the bracket.

In another aspect, the disclosure provides a means for attaching heavy objects, or objects that will have strong pulling forces associated with them. These heavy objects are attached to the channel with metal brackets and metal pins.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative, and are not intended to limit the scope of claimed inventions and are not intended to show every potential feature or embodiment of the claimed inventions. The drawings are not necessarily drawn to scale; in some instances, certain elements of the drawing are enlarged with respect to other elements of the drawing for purposes of illustration.

FIGS. 4A-C are two perspectives of a u-shaped cover for use in embodiments of the overhead mounting system described herein;

FIG. 8 is a molded bracket and light with attachment points.

DETAILED DESCRIPTION

Figure 1A:
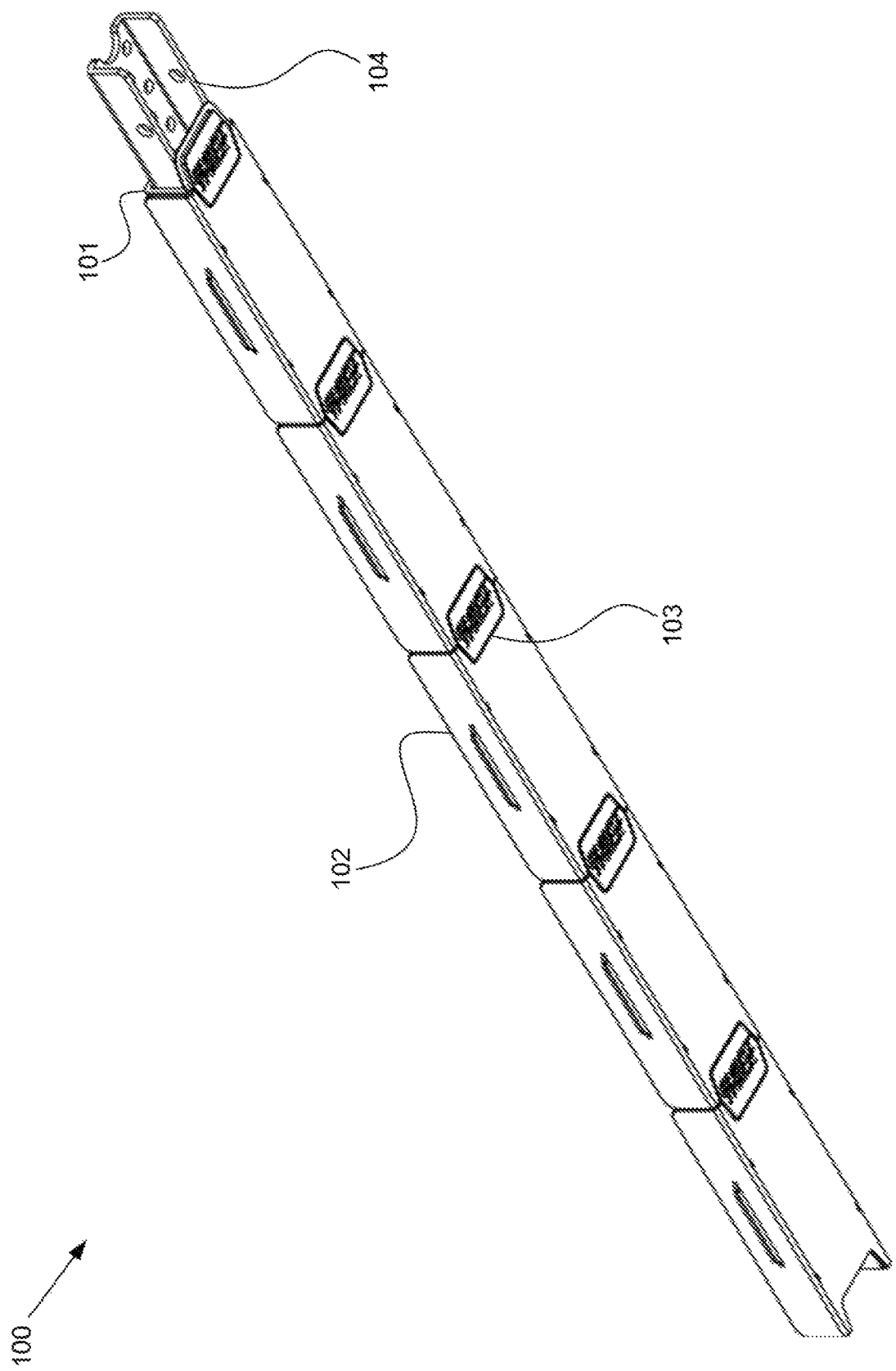
FIGS. 1A-E are various perspectives of an overhead mounting system.
Figure 1B:
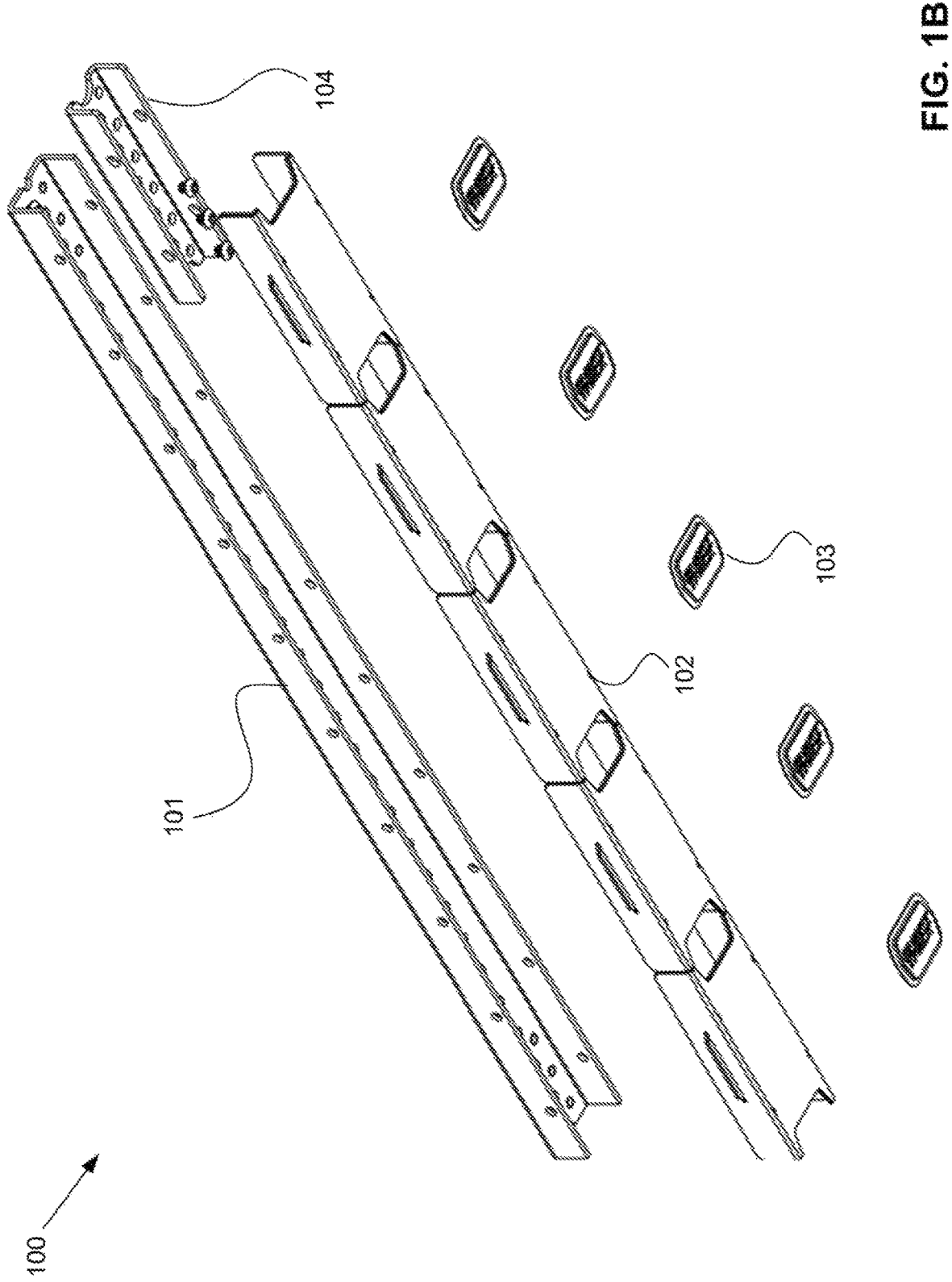
Figure 1C:
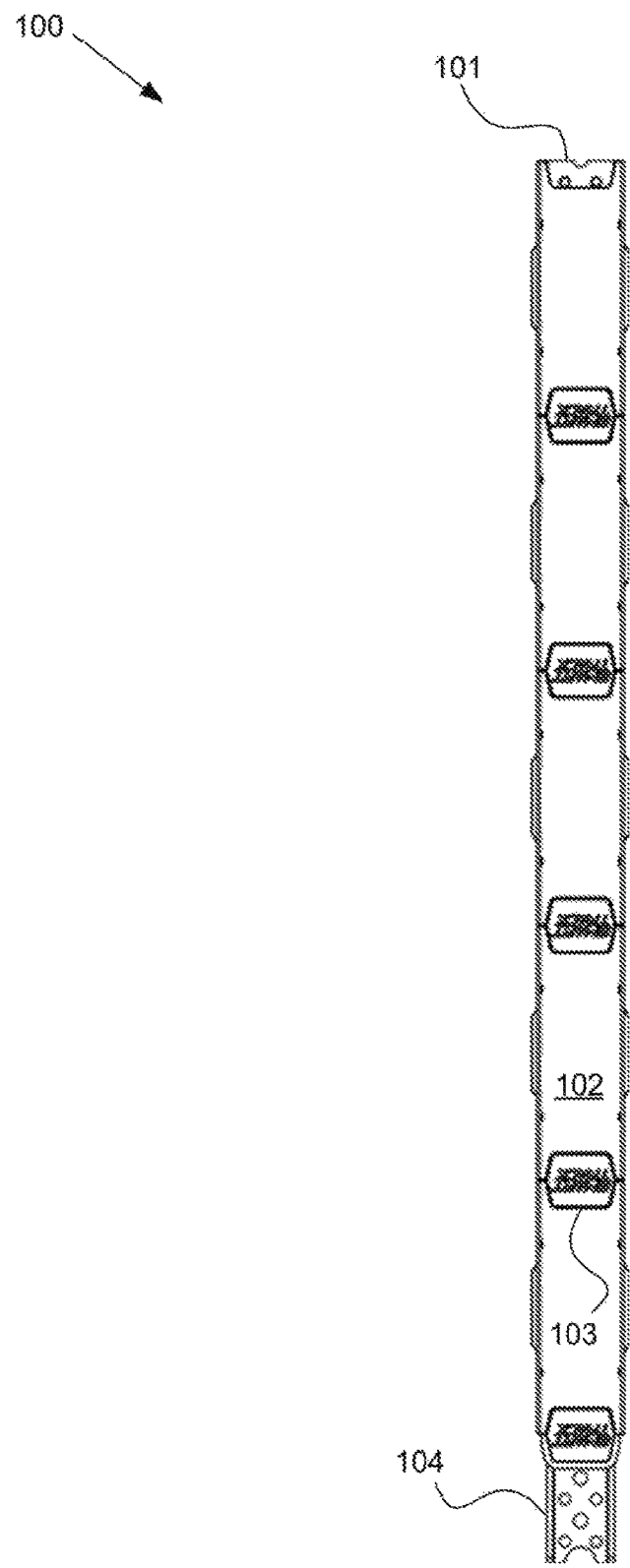
Figure 1D:
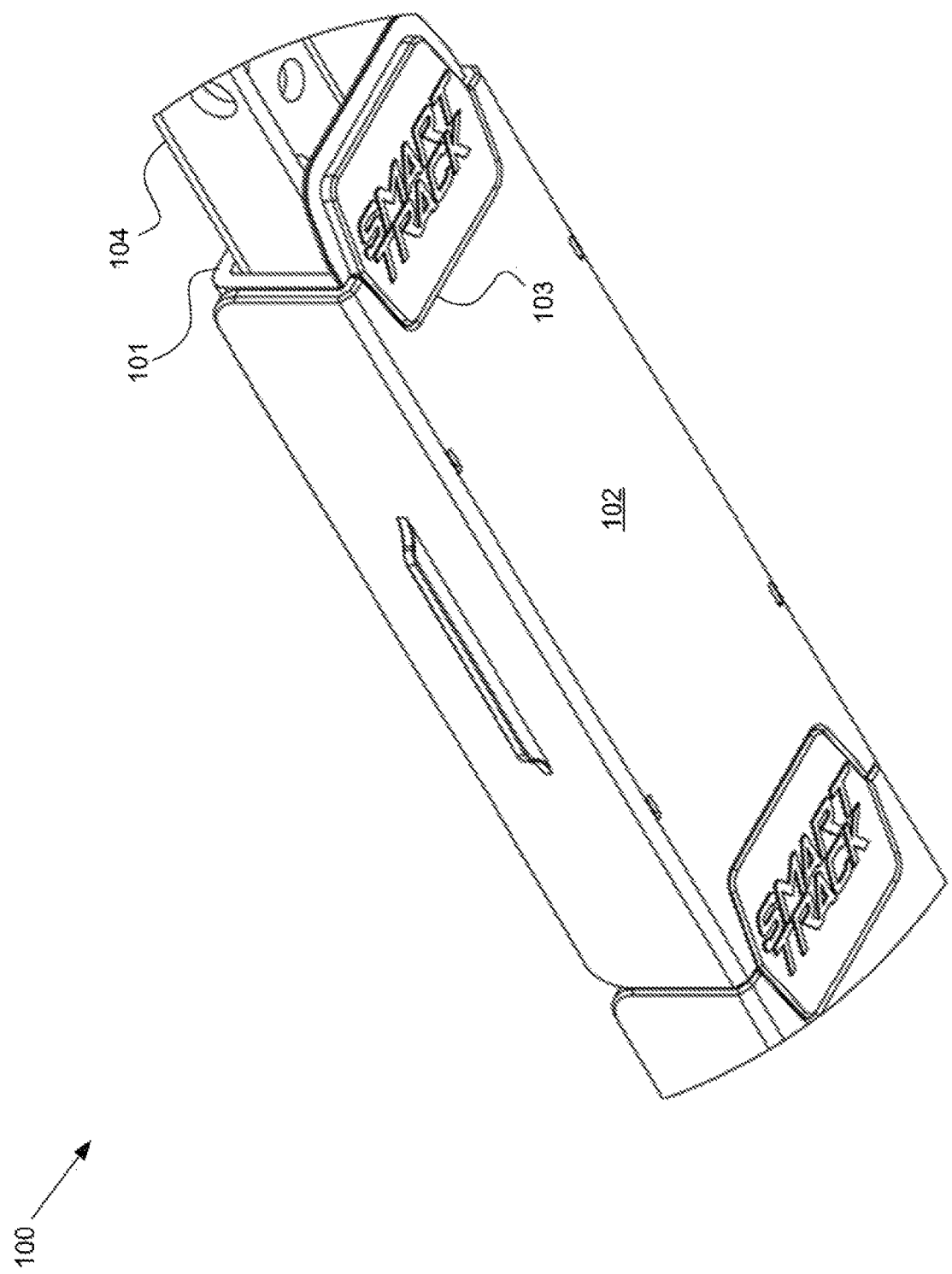
Figure 1E:
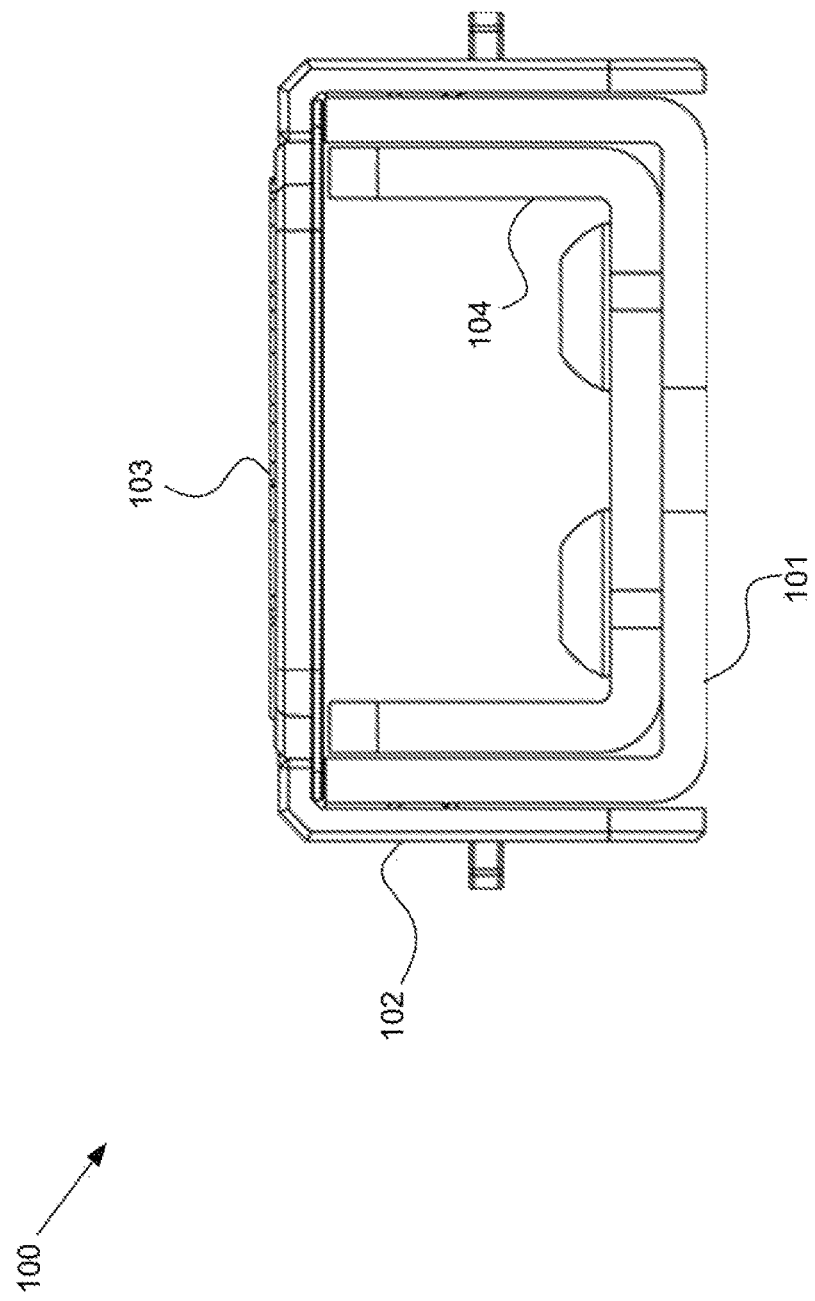
Figure 2:
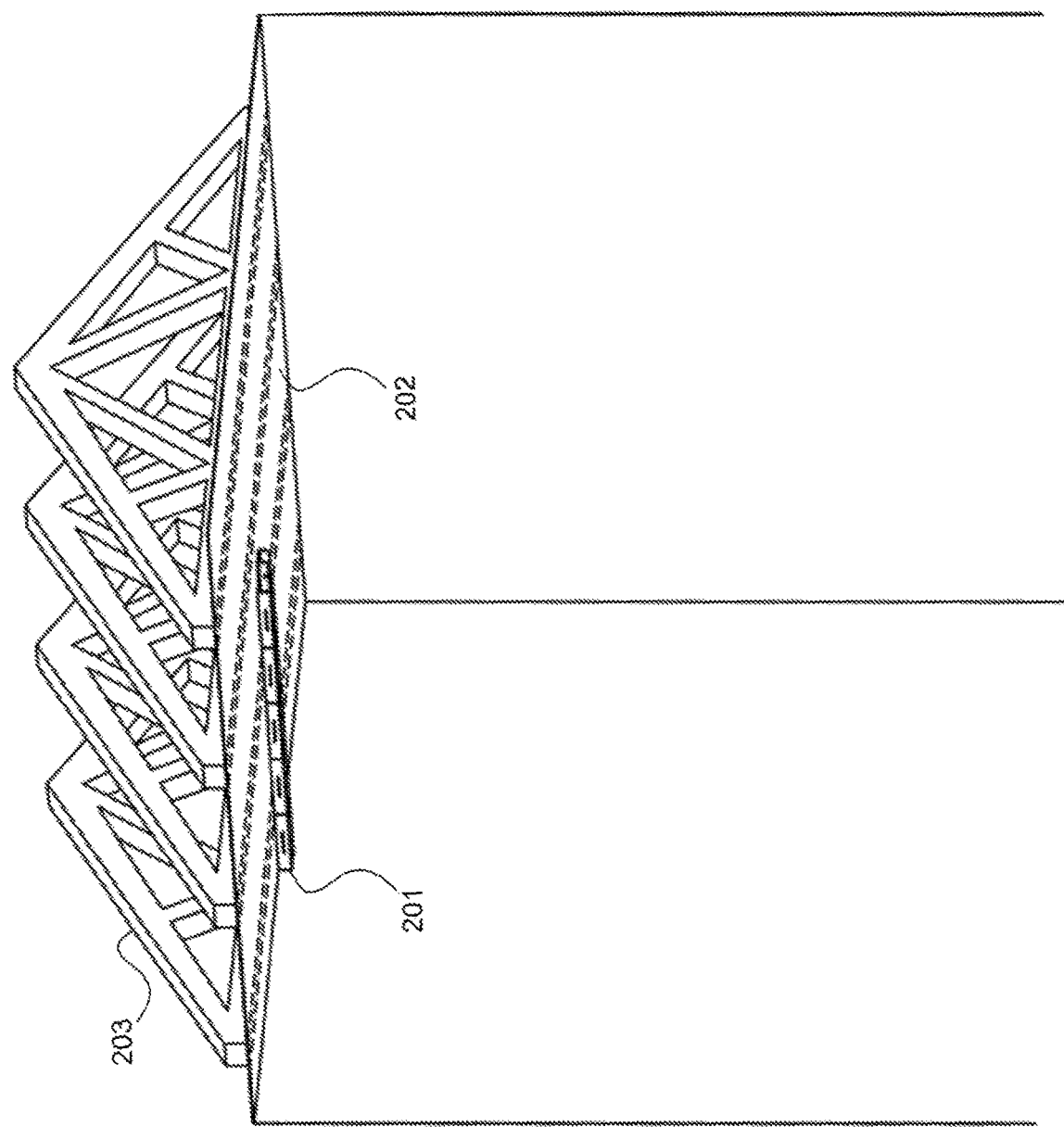
FIG. 2 is an isometric view of an overhead mounting system mounted to a ceiling of a garage.
Figure 3:
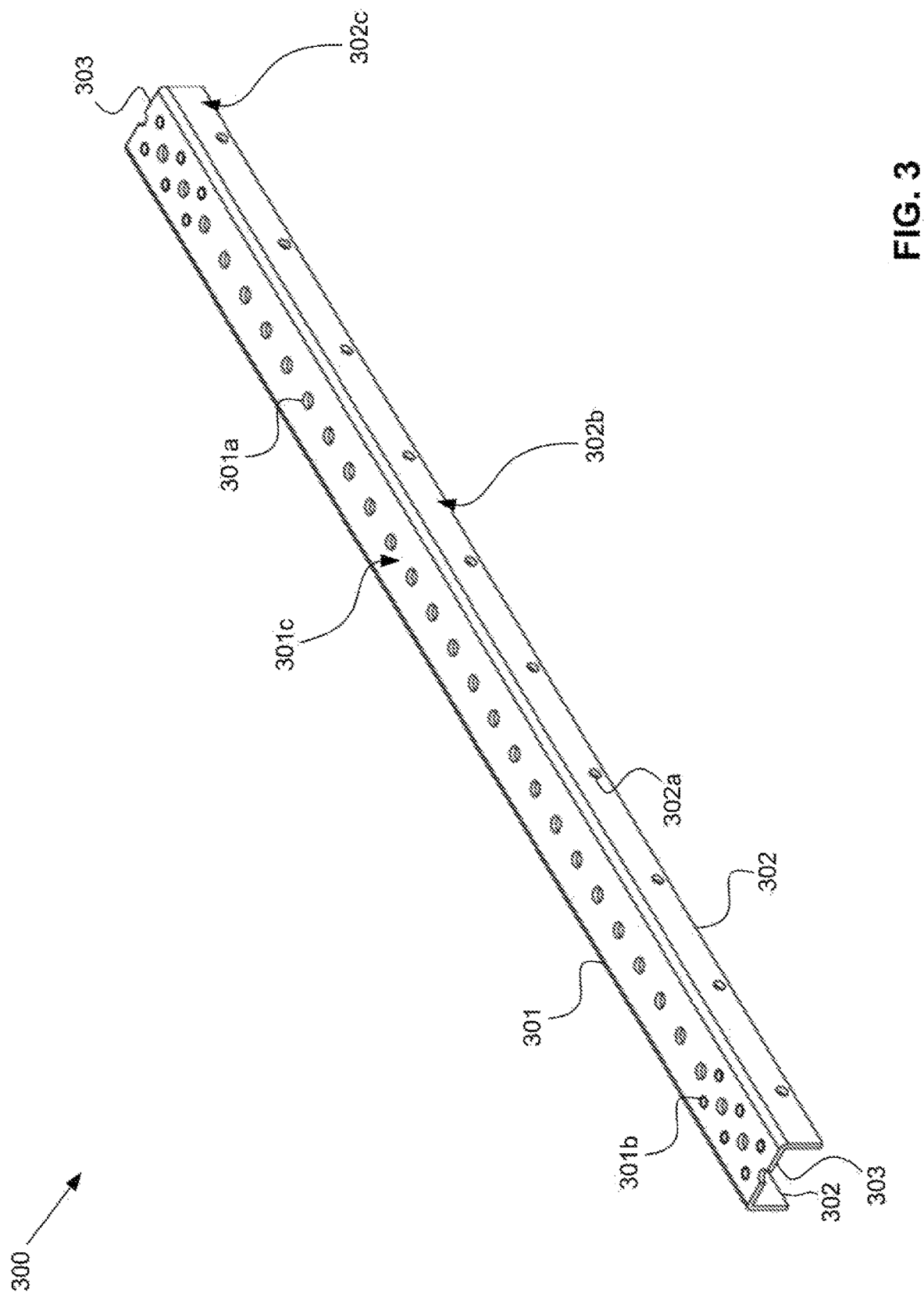
FIG. 3 is a bottom-isometric view of a u-shaped channel for use in embodiments of the overhead mounting system described herein.

The following description recites various aspects and embodiments of the inventions disclosed herein. This application incorporates by reference all the subject matter disclosed in the following references: US Patent Application No. 20150284221A1 by David R. Hall et al., filed Apr. 3, 2014 and entitled "Compact Motorized Lifting Device"; US Patent Application No. 20160236916A1 by David R. Hall et al., filed Apr. 27, 2016 and entitled "Multiple Motorized Lifting Devices Mounted to a Structure"; US Patent Application No. 20170318649A1 by David R. Hall et al., filed May 2, 2016 and entitled "Wireless Rail with Dynamic Lighting"; U.S. patent application Ser. No. 15/487,999 by David R. Hall et al., filed Apr. 14, 2017 and entitled "Overhead Mounting System"; U.S. patent application Ser. No. 15/488,860 by David R. Hall et al., filed Apr. 17, 2017 and entitled "Overhead Mounting System for Daisy-Chained Devices"; U.S. patent application Ser. No. 15/605,518 by David R. Hall et al., filed May 25, 2017 and entitled "Obscured-Feature-Finding and Device-Mounting Apparatus"; U.S. patent application Ser. No. 15/608,459 by David R. Hall et al., filed May 30, 2017 and entitled "Device-Mounting Channel with Cradle for Cable."

No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Embodiments of overhead mounting systems are described herein. The components; including power tools and accessories that are to be hung on the mounting system vary in weight and the amount of pulling force applied to them. Though there are varying weights and forces for the different tools and accessories the mounting system has a unified solution for attaching the tools and accessories to the mounting channel. Every component; including accessories or tools is thus easily attachable to the channel.

The overhead mounting system includes a channel that is attached to the garage ceiling or beams. This channel includes holes on the vertical sides through which the tools and accessories attach to the channel. The holes are evenly spaced, and the holes in the mounting track match the holes and protrusions on the mounting brackets, thus accommodating attaching the power tools or accessories in the most advantageous place for their use.

Embodiments of overhead mounting systems are described herein. Various embodiments include a channel, brackets for attaching lightweight object, brackets and pins for attaching heavy objects, one or more covers, and one or more cover spacers. The channel includes a channel base, at least two channel walls, and at least two channel ends. The channel walls are connected perpendicularly to the channel base such that the channel is U-shaped. The channel base includes a plurality of channel base openings. The channel walls each comprise a plurality of channel wall openings spaced from each other by a channel wall inter-opening length. One or more of the channel wall openings is spaced from at least one of the channel ends by half the channel wall inter-opening length.

The covers include a cover base, at least two cover walls, and at least two cover ends. The cover walls are connected perpendicularly to the cover base such that the cover is u-shaped. The cover walls each include one or more inward protrusions. At least one of the one or more inward protrusions is spaced from at least one of the cover ends by half the channel wall opening length. The cover ends are concaved along the cover base such that a cover base length is less than a cover wall length. The cover ends are concaved along one or more of the cover walls such that the cover wall length is less than the cover base length.

The cover spacers include a flange and a spacer base. The spacer base includes a shape complementary to the cover end concavity. The U-shaped channel has an exterior width less than or equal to a U-shaped cover interior width extending between the cover walls. The U-shaped channel exterior width is greater than a width across the U-shaped cover between at least two laterally aligned inward protrusions. The channel exterior width ranges from half an inch to four inches, one inch to $3\frac{1}{2}$ inches, $1\frac{1}{2}$ inches to three inches, or two inches to $2\frac{1}{2}$ inches. The cover interior width ranges from $\frac{9}{16}$ an inch to $4\frac{1}{16}$ inch, $1\frac{1}{16}$ inch to $3\frac{9}{16}$ inches, $1\frac{9}{16}$ inches to $3\frac{1}{16}$ inches, or $2\frac{1}{16}$ inches to $2\frac{9}{16}$ inches.

The channel is used to mount one or more devices to a surface. The surface includes overhead surfaces such as a ceiling, a wall, or a floor. The channel accommodates wiring for the devices. The covers support and/or hide the wiring. The concavity allows the wiring to pass from the channel and connect to the devices. The cover spacers between the covers in the concavities where no wiring passes from the channel and/or where two covers are directly adjacent each other. The channel, the attachment brackets, the covers, and the spacers are comprised of one or more materials, and in some cases combinations of materials. Such materials include any of a variety of thermoplastics, including acrylic, ABS, nylon, PLA, polybenzimidazole, polycarbonate, polyether sulfone, polyether ether ketone, polyetherimide, polyethylene, polyphenylene oxide, polyphenylene sulfide, polypropylene, polystyrene, PVC, and/or TEFLON, one or more metals, including aluminum, iron, steel, brass, and/or chrome, and/or one or more composite materials including carbon, carbon fiber, and/or fiberglass. Such materials include combinations of the previously listed materials. In some embodiments, the channel and the brackets for heavy objects are comprised of powder-coated steel, and the brackets for lightweight objects, the covers and cover spacers are comprised of injection-molded ABS. In some embodiments the channel is composed of galvanized steel. In another embodiment the channel is composed of metal, such as steel, covered in a protective material, the protective material is applied by dipping or spraying and is a rubberized or plasticized material.

In some embodiments, the channel is mounted overhead to one or more trusses, such as in a garage. The channel is mounted directly to the trusses, or mounted to the trusses through a ceiling such as a drywall ceiling. In a preferred embodiment the channel is mounted to the ceiling by two lag bolts screwed into two truss beams. The lag bolts pass through channel base openings. The channel is mounted along a length of a single truss, perpendicular to a single truss, or perpendicular across two or more trusses. A significant problem in designing overhead mounting systems is the variability in inter-truss spacing. Depending on the type of construction and the builder, inter-truss spacing ranges, on average, from 16 inches to 24 inches. Thus, to capture at least a minimum of two trusses at the minimum average inter-truss spacing, the channel must have a length of at least 16 inches. Accordingly, the length of the channel ranges from 16 inches to 48 inches in various embodiments. Another factor to consider when designing overhead mounting systems is the average number of devices a consumer will use and what inter-device spacing the average consumer will use.

The instant inventors have discovered an optimal channel length that balances the variability in inter-truss spacing and the variability in consumer usage is 30 inches. Accordingly, in various embodiments, the length of the channel is 30 inches. The instant inventors have also discovered an optimal number of spaces provided on each channel for accommodating devices and covers is 5. Accordingly, in various embodiments, a length of the channel is five times a length of the cover. In one embodiment the channels, for example, accommodate five covers consecutively, or the channel accommodates four full covers and half each of two additional covers, the two halves accommodated at the channel ends. For example, be an optimal arrangement in embodiments where two or more channels are aligned directly adjacent each other. In such embodiments, a cover or a device is often mounted across the seam between the two adjacent channels. The instant inventors have found that such an arrangement improves the weight distribution of devices across multiple channels.

The channel base includes a flat bar having a narrow width relative to its length. The length-to-width ratio ranges from 6:1 to 48:1. The channel walls extend from sides of the channel base along the length of the channel base. Each channel wall forms an angle with the channel base ranging from 45 degrees to 135 degrees, from 50 degrees to 130 degrees, from 60 degrees to 120 degrees, from 70 degrees to 110 degrees, from 80 degrees to 100 degrees, from 85 degrees to 95 degrees, from 89 degrees to 91 degrees, and/or 90 degrees. In some embodiments, the angle that each channel wall forms with the channel base varies along the length of the channel. In some embodiments, the channel walls extend from opposite sides of the channel base. The channel walls include flat bars having narrow widths relative to their lengths. The channel wall length-to-width ratio ranges from 6:1 to 48:1. The channel ends are formed of the end-edges of the channel base and the channel walls and run along the widths of the channel base and the channel walls.

In some embodiments, the channel base and/or the channel walls are contoured. The contouring is along edges of the channel base and/or channel walls, and/or is along surfaces of the channel base and/or channel walls. The contouring corresponds to contouring in a surface to which the channel is mounted, or a surface against which the channel rests. In various embodiments, the contouring in the surface and/or the channel is non-linear.

The channel base includes one or more openings through which the channel base is mounted to a surface. For example, one or more lag bolts, screws, and/or drywall fasteners pass through the channel base openings. The channel base openings have a larger diameter than the channel wall openings. The channel base openings have a diameter ranging from half an inch to 1½ inches, from ¾ an inch to 1¼ inches, or one inch. The channel wall openings have a diameter ranging from ⅛ an inch to ½ an inch. The channel base openings are spaced from each other by a channel base inter-opening length. The channel base inter-opening length ranges from half an inch to three inches, from one inch to 2½ inches, or from 1½ inches to two inches. The channel base inter-opening length is shorter than the channel wall inter-opening length. The configuration of the channel openings simplifies installation by allowing a user to easily distinguish the channel base from the channel walls. Additionally, a closer channel base inter-opening spacing more readily accommodates a variety of inter-truss spacing. The instant inventors have discovered that a ratio of three channel base openings for every two channel wall openings is optimal to balance the variability in inter-truss spacing and the variability in how consumers will typically use the channel. Accordingly, the channel includes three channel base openings for every two channel wall openings.

The channel wall inter-opening length corresponds to a space between the inward protrusions of the covers. The channel wall inter-opening length corresponds to openings, pins, and/or protrusions on one or more device-mounting brackets. The channel wall inter-opening length ranges from two inches to seven inches, from 2½ inches to 6½ inches, from three inches to six inches, or from four inches to five inches. Similarly, the spacing between the inward protrusions along the same wall of the cover ranges from two inches to seven inches, from 2½ inches to 6½ inches, from three inches to six inches, or from four inches to five inches. In some embodiments, the channel wall inter-opening length and the inward protrusion spacing is four inches.

The channel cover mounts to the channel such that a cavity is formed between the channel base and the cover base. The cavity accommodates wiring for devices mounted to the channel, and shields the wiring from view. For example, the cover is connected to the channel such that the cover base disposed opposite the channel base. The inward protrusions are each be disposed in corresponding channel wall openings. In embodiments where the channel is mounted overhead, the protrusions rest on interior surfaces of the channel wall openings such that the cover is secured to the channel by the inward protrusions. As described above, in some embodiments, multiple covers are connected to the channel. For example, the mounting system includes at least a first and a second cover. The covers are connected to the channel, and are disposed directly adjacent each other. The ends of the cover walls directly contact each other. A portion of the ends of the cover bases directly contact each other. The first and second concavities are formed in the first and second cover bases, and are disposed opposite each other. In some embodiments including at least two covers connected to the channel adjacent each other, the spacer is disposed in the concavities between the adjacent covers. The flange touches and/or rest on inside surfaces of the cover bases, and the spacer base is disposed between the cover bases in the concavities.

The cover base includes a flat bar. The cover base length-to-width ratio ranges from 1:1 to 48:1. The cover has a length ratio with the channel ranging from 1:1 to 1:48. The cover walls extend from sides of the cover base along the length of the cover base. The cover walls, in some embodiments, include one or more grasping flanges extending from external surfaces of the cover walls. Such are useful for removing the cover from, and attaching it to, the channel. Each cover wall forms an angle with the cover base ranging from 45 degrees to 135 degrees, from 50 degrees to 130 degrees, from 60 degrees to 120 degrees, from 70 degrees to 110 degrees, from 80 degrees to 100 degrees, from 85 degrees to 95 degrees, from 89 degrees to 91 degrees, and/or 90 degrees. In some embodiments, the angle that each cover wall forms with the cover base vary along the length of the cover. The variability is complementary to an angle variability of the channel base and channel walls. In some embodiments, the cover walls extend from opposite sides of the cover base. The cover walls similarly include flat bars. The cover wall length-to-width ratio ranges from 1:1 to 48:1. The cover ends are formed of the end-edges of the cover base and the cover walls and run along the widths of the cover base and the cover walls.

In some embodiments, the cover base and/or the cover walls are contoured. The contouring is along edges of the cover base and/or cover walls, and/or is be along surfaces of the cover base and/or cover walls. The contouring is complementary to contouring in the channel. The contouring is non-linear.

The cover and lightweight removable brackets have protrusions that face the interior of the cover. These inward protrusions facilitate mounting of the cover to the channel. Accordingly, the one or more inward protrusions include a bump having at least one sharp edge and at least one sloped edge, at least two sharp edges and at least two sloped edges, or may be semi-spherical. The sloped edge is oriented closest to the cover base, or the sloped edges are oriented perpendicular to the cover ends. The sloped-edge, sharp-edge configurations allow for ease in placing the cover on, and removing the cover from the channel, and saves in large-scale manufacturing costs by reducing the amount of material required to form the bumps.

Each wall of the removable cover and the removable brackets include one or more inward protrusions, the protrusions of opposing walls aligned with corresponding channel wall openings. The protrusions are aligned with each other parallel the width of the cover or bracket base, and complementary channel wall openings are aligned parallel with the width of the channel base. In some embodiments, each cover or bracket wall includes two or more inward protrusions spaced from each other by the channel wall inter-opening length.

As described above, the concavity allows wiring to pass from the channel and connect to one or more devices connected to the track. The concavity may have a variety of shapes, including polygonal, rounded, jagged, or combinations thereof. In various embodiments, a depth of the concavity may range from one-eighth of the channel wall inter-opening length to three quarters of the channel wall inter-opening length. The instant inventors have discovered that a concavity with a depth equal to one quarter of the channel wall inter-opening length provides optimal space for wiring to pass from the channel while still providing optimal coverage of the channel, giving the channel and wiring a controlled, minimalist appearance.

The concavity is disposed along the cover walls, the cover base, or at least one cover wall and the cover base. In some embodiments, the concavity is disposed along the cover walls on at least one of the cover ends, and the concavity is disposed along the cover base on an opposite cover end of the at least one cover end. This configuration allows for variability in how the wiring connects to different devices.

The cover spacer rests on the cover bases of two directly-adjacent covers, the cover walls of two directly-adjacent covers, or both. The cover spacer rests on the cover base and/or cover wall of only one cover. The cover spacer is disposed in the concavity of a single cover base or in the concavity of two directly-adjacent cover bases. In various embodiments, the spacer has a shape complementary to the concavity. In certain embodiments the spacer is symmetrical, such as in embodiments where the concavities of directly-adjacent covers have the same shape. In certain embodiments, the spacer is asymmetrical, such as in embodiments where the concavities of directly-adjacent covers have different shapes.

In some embodiments, the cover spacer passively rests in the concavity. In some embodiments, the spacer actively connects to the cover in the concavity. For example, in some embodiments, the spacer magnetically attaches to at least one of the cover ends. In certain embodiments, the cover includes a ferromagnetic material at the ends, and the spacer includes one or more magnets, such as in the flange or the spacer base. In some embodiments, a handle extends from the spacer base on an opposite side of the spacer base from the flange. The handle simplifies installation and removal of the spacer into and from the concavity.

The overhead mounting system includes an end cover corresponding to one or more ends of the channel. The end cover is U-shaped to correspond to the shape of the channel, or includes any of the variety of angles discussed above regarding the channel and the cover. The end cover is structured similarly to the cover. The end cover includes an end cover base and at least three end cover walls connected perpendicularly to the cover base. At least two of the end cover walls are parallel to each other and at least one of the end cover walls is perpendicular to the at least two parallel end cover walls. The third end cover wall covers end edges of the channel base and channel walls. The parallel end cover walls each include one or more inward protrusions. At least one of the one or more inward protrusions are spaced from the perpendicular end cover wall by half the channel wall inter-opening length, and corresponds to at least one channel wall opening. Each parallel end cover wall includes such an inward protrusion.

Some embodiments of the overhead mounting system include a bridge that connects the channel to other neighboring channels. The channels have one or more bridge openings corresponding to the bridge. The bridge reinforces a seam between two neighboring channels In some embodiments the overhead mounting system extends the length of the channel by attaching multiple channels together with the use of connectors. The connectors connect the channels and allow the channel to extend. In the preferred embodiment the connectors are load bearing and extend the channel while maintaining the full strength of the system.

In some embodiments various components of the overhead mounting system, including the channel, the cover, and/or the cover spacer, are formed by a plastic injection molding process. For example, in some embodiments, plastic injection molding forms the cover. The cover includes one or more injection molding openings disposed in the cover base along an edge formed by the cover base and at least one of the cover walls. Each opening is aligned with at least one inward protrusion. The opening corresponds to a negative contour in the mold that forms the inward protrusion.

The overhead mounting system is a solution to keeping cords out of the way. Cords, such as power cords, connection cords for computing and communicating and other cords are necessary but are often a challenge. It often seems that no matter how well organized a space is, if there are cords running to devices those cords will inevitably find a way to tangle, trip, or otherwise be a nuisance to those using the space. The channel and covers for the overhead mounting system create a space where cords will still have access to devices but will be kept from being a nuisance. When the covers are installed on the channel a space is created where the cords rest and do not dangle, trip or tangle. By running the cords in the space created by the channel and the covers a cleaner safer space can be created.

The overhead mounting system is a solution to disorganized garages, making it possible to have tools and attachments in an out of the way location where they can be easily accessed. The system also allows the interchange of different tools and accessories so that different tools are available to use at different times. The system also allows tools of differing dimensions, masses, power requirements and pulling forces to use the same channel. The components mount in a variety of locations along the channel and can be moved from one location to another. An advantage of the preferred embodiment of the overhead mounting system is that the mounting channel and the attachment brackets are configured so that the attachment brackets and components are removable and attachable without the use of tools. One downfall of many systems is that they are static, once the component is attached to the ceiling or the mounting option; the tool stays there and can only be removed with tools and effort. The preferred embodiment of the described system allows for easy exchange of attached objects, without tools. The ability to easily interchange attached objects is a benefit to the preferred embodiment of the system. There are many reasons to change the location of an attached object, sometimes the location of workbenches or ground-based storage are moved to a new location and overhead attachments need to be moved to accommodate the changes made below them. It would be very frustrating to install an inflator overhead and then not be able to access the inflator because a freezer was placed beneath it. The preferred embodiment of the overhead mounting system eliminates this issue and allows the inflator to be removed from the channel without tools and reattached without tools in a location along the channel that allows access.

The tools and accessories that are light weight or do not have pulling forces on them, such as; lights, speakers, cameras or other devices are attached to the mounting track using an attachment utilizing molded protrusions. These protrusions enable the attachment to snap into place on the mounting track channel. Typically, the attachment is made from a plastic material.

In some embodiments the attachment bracket is molded directly onto the tool or accessory. In other embodiments there is an attachment bracket, with mounting protrusions molded into the vertical sides of the bracket that match with the openings in the mounting track, additionally there is a mounting attachment molded to the base of the mounting bracket. The mounting attachment on the base of the mounting bracket is two molded protrusions that resemble the heads of a screw or nail. Though it is a known method to attach objects to ceilings or walls via openings in the object and connecting via nails or screws, it has not previously been used as part of a mounting system. It was also possible to use screws or nails spaced in the appropriate places. An advantage to adapting this mounting method to the overhead mounting system is that it opens up possibilities for what can be mounted on the track. Additionally, the accessories made for use with this type of attachment could be used without using the overhead mounted track.

Heavier tools and accessories as well as those that have pulling forces on them need a stronger attachment. Typically, the attachment bracket for these heavier objects is made of metal, to increase the strength of the attachment, additionally the attachment uses metal pins to secure the heavier object, in certain embodiments these pins are spring pins, or other similar pins such as cotter pins, in some embodiments nuts and bolts can be used. Spring pins are generally preferred as they are easier to insert and remove. Heavy tools and accessories along with those having pulling forces on them include but are not limited to winches, power cord assemblies, fans, air compressors, heaters and many others.

In another embodiment the overhead mounting system is used in a shed or other secondary structure. For use in a smaller structure the overhead system need not be as robust as the system used in a garage or other primary structure, in fact the shed is not designed to accommodate loads as high as that of a garage so the overhead mounting system used in the shed is designed such that the components able to be mounted are those of the lighter variety and those with low or no pulling forces on them. In one embodiment the U-shaped channel of the overhead mounting system for use in a shed is constructed of a thermoplastic material.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, 'nail head protrusion' is meant to refer to protrusions that resemble the head and a small portion of the body of a nail.

As used herein, 'components' is meant to refer to all tools, accessories and other objects that mount to the overhead mounting system.

The overhead mounting system 100 includes a U-shaped channel 101, a set of five u-shaped covers 102, a set of four cover spacers 103, and a load bearing connector 104. The covers mount to the channel, and the spacers are disposed between neighboring covers. The covers are connected to the channel such that each cover touches each neighboring cover. The load bearing connector 104 attaches two channels 101 together. The load bearing connector 104 attaches inside the channels 101 and creates a channel that is longer than the individual sections of the channel.

The overhead mounting system 201 is mounted to the ceiling 202 by lag bolts screwed into trusses 203. The overhead mounting system spans across two trusses.

The channel 300 includes a channel base 301, a plurality of channel base openings 301a, a plurality of channel bridge openings 301b, two channel walls 302, a plurality of channel wall openings 302a, and two channel ends 303. Each channel base opening is spaced from its neighboring channel base openings by a channel base inter-opening length 301c. Each channel wall opening is spaced from its neighboring channel wall openings by a channel wall inter-opening length 302b. Two channel wall openings are spaced from the channel ends by half the channel wall inter-opening length 302c.

Figure 4A:
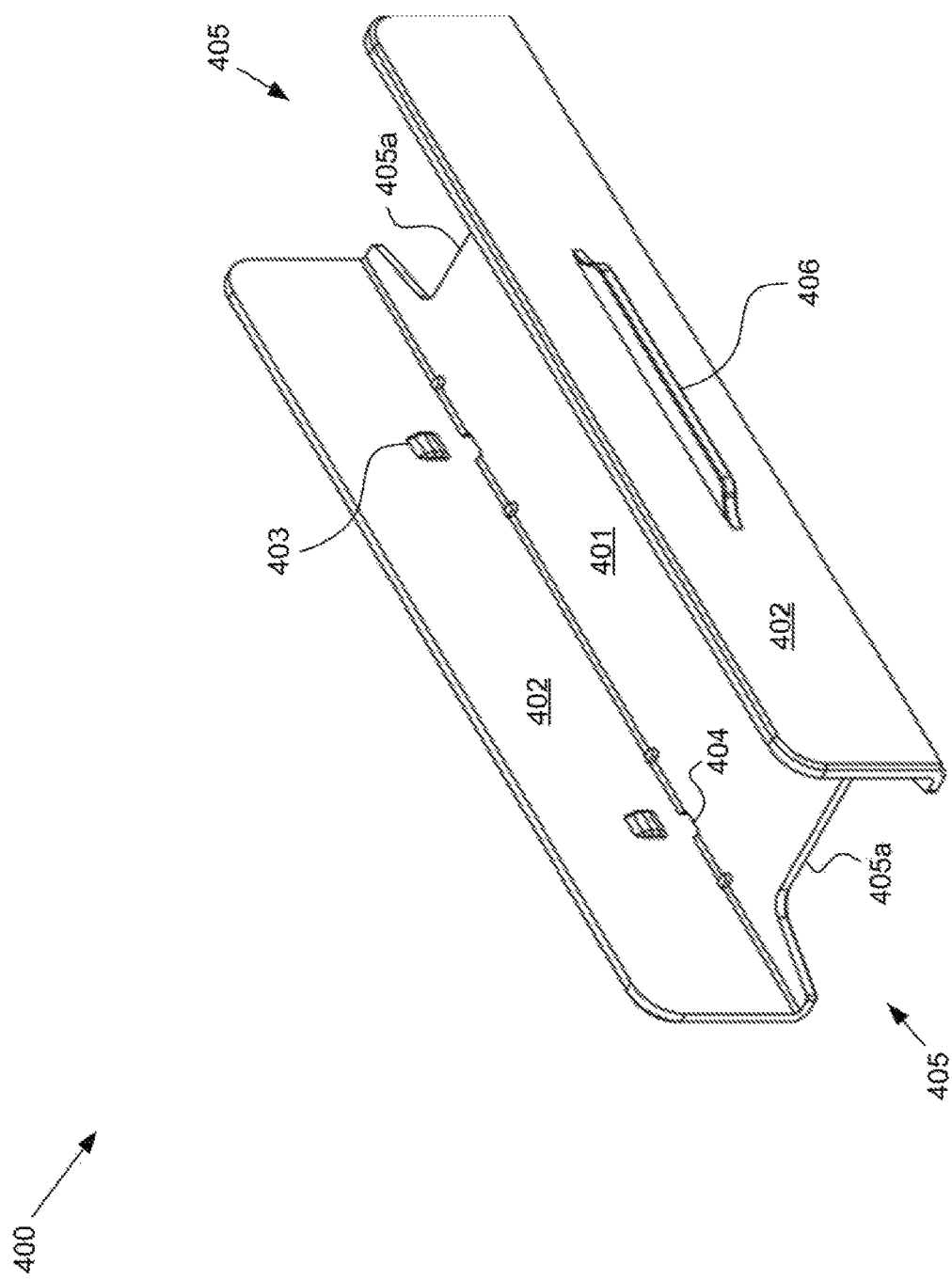
Figure 4C:
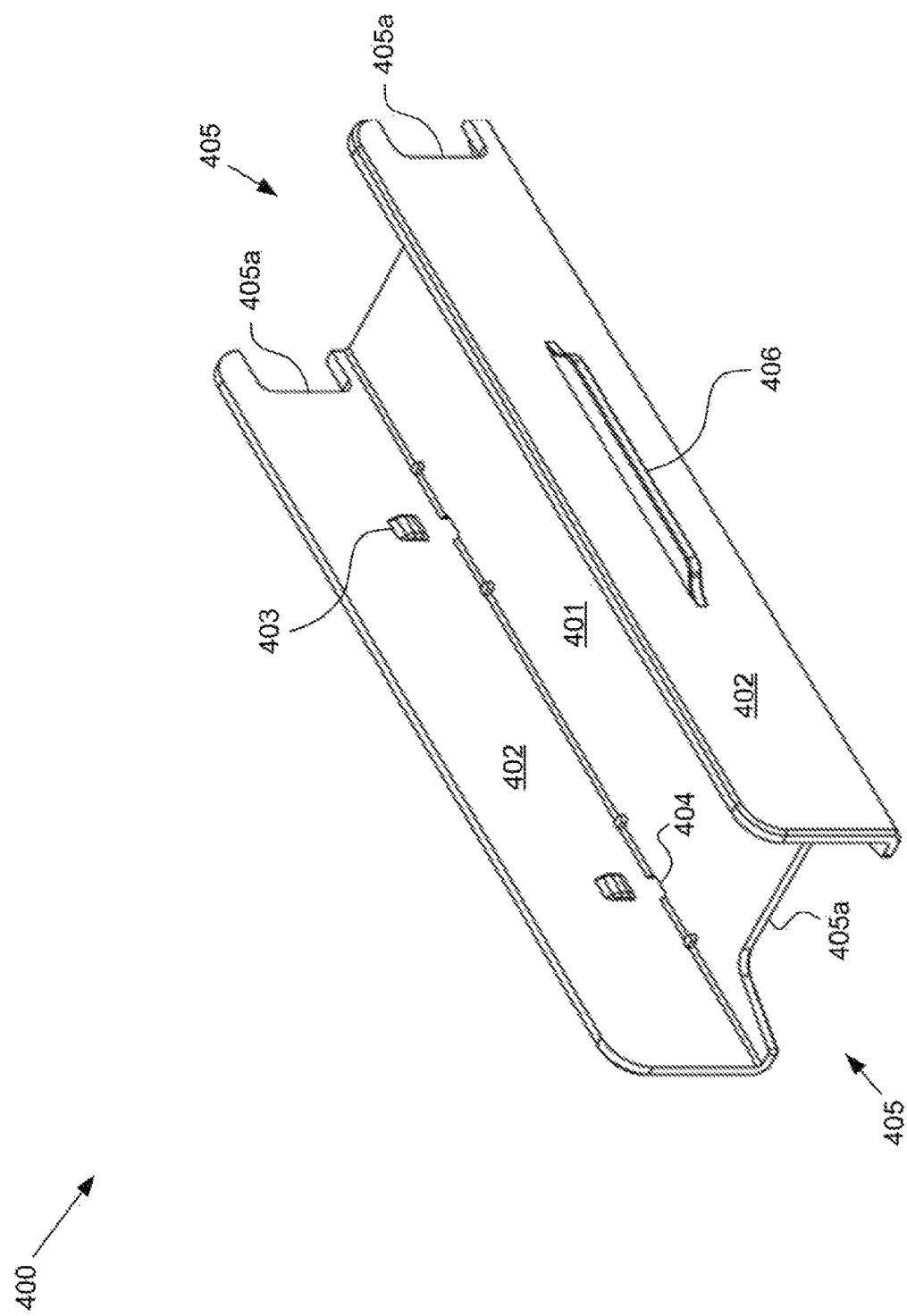
Figure 5:
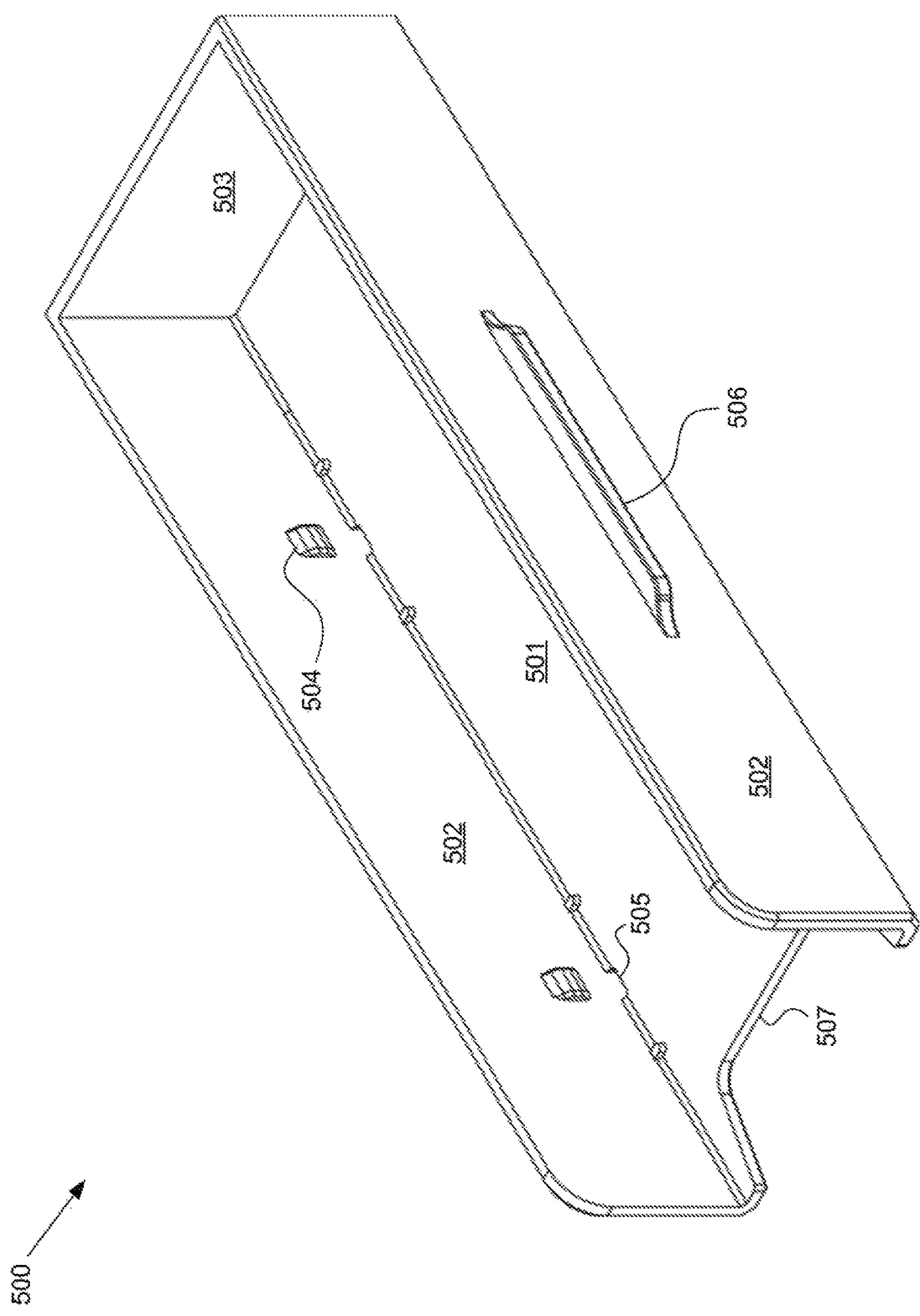
FIG. 5 is an isometric view of a u-shaped end cover.
Figure 6:
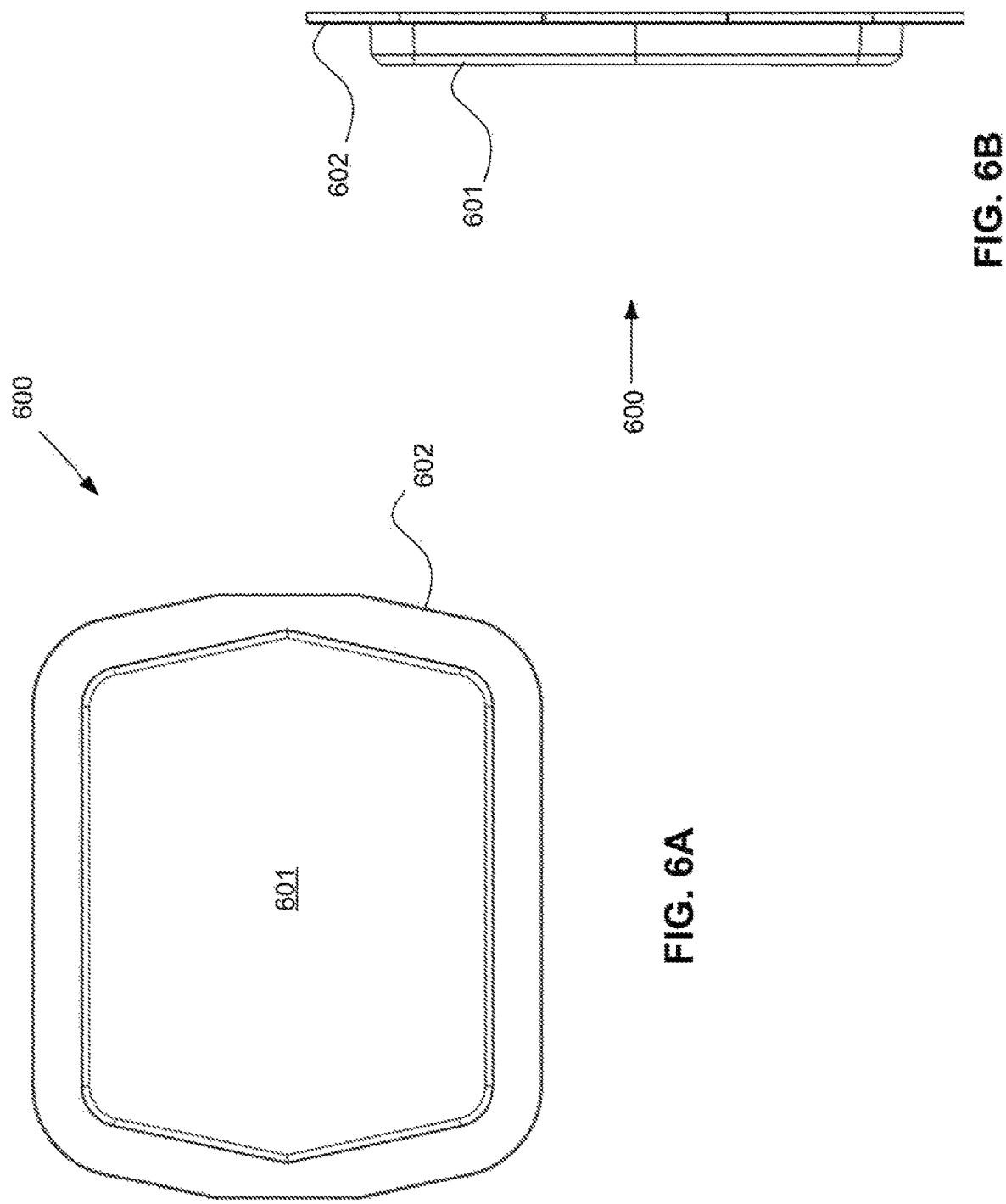
FIGS. 6A-B are two perspectives of a cover spacer for use in embodiments of the overhead mounting system described herein.
Figure 7:
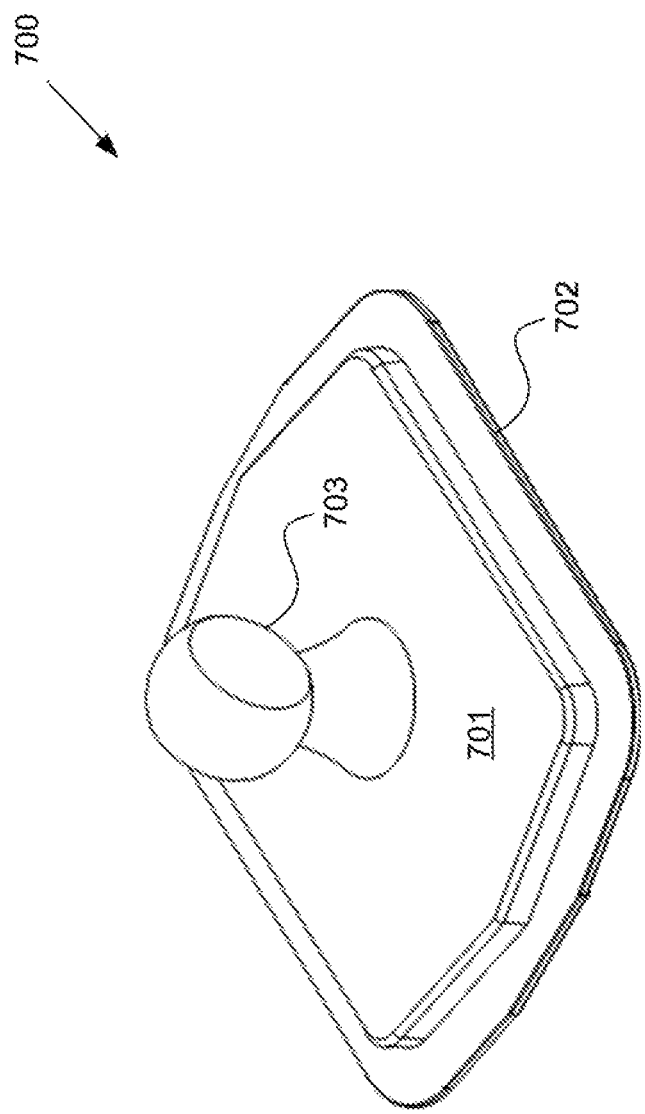
FIG. 7 is another embodiment of a cover spacer for use in embodiments of the overhead mounting system described herein.

The cover 400 includes a cover base 401, two cover walls 402, inward protrusions 403, injection molding openings 404, two cover ends 405 with concavities 405a, and handle protrusions 406. In FIG. 4A, the concavities are disposed in the cover base. In FIG. 4C, one concavity is disposed in the cover base at one end, and two concavities are disposed in the cover walls at the opposite end.

The end cover 500 includes an end cover base 501, two parallel end cover walls 502, one perpendicular end cover wall 503, inward protrusions 504, injection molding openings 505, handle protrusions 506, and an end concavity 507.

The cover spacer 600 includes a spacer base 601 and a spacer flange 602.

The cover spacer 700 includes a spacer base 701, a spacer flange 702, and a spacer handle 703.

The attachment bracket 800 is made of injection-molded plastic. The bracket fits over the overhead channel and is kept in place by molded protrusions 801 that correspond to the inter channel wall openings of the overhead channel. These molded protrusions 801 fit within the inter channel wall openings to lock the mounting bracket in place, this keeps the object attached to the bracket from sliding along the length of the channel as well as from falling off the channel. The mounting bracket also has a protrusion 803 on the base of the bracket; this protrusion is shaped like a nail or a screw with a 'head' having a larger diameter than the diameter of the 'neck'. The shape of this 'nail head' protrusion 803 functions in much the same way as a nail the larger diameter of the 'head' functions to keep objects or materials from sliding past the 'head'. The accessory in this embodiment, a light 804 has corresponding keyholes 805 molded into it for attaching to the bracket. The molded nail head 803 fits into the hole 806 of the keyhole and slides along the neck 807 till it locks in place. The distance between the base of the bracket 800 and the underside of the 'nail head' 803 corresponds to the thickness of the molded plastic in the neck 807 of the keyhole 805, this creates a firm connection for the attachment of the accessory to the bracket. While the current embodiment describes a light, there are many other lightweight components that use the same mounting system, including speakers, cameras, motion detectors, lasers, and other components.

In another embodiment the molded bracket 800 is molded directly onto the component to be attached to the overhead channel, forgoing the 'nail head' protrusion and the 'keyhole' attachment. When configured in this manner the attachment of components becomes simpler, however versatility is lost in that the component will only be able to attach to the overhead channel and loses the option of creating other attachments.

For ease of attachment and removal, the preferred embodiment of, the molded bracket includes a handle protrusion 802 molded to each side. This molded handle protrusion 802 gives purchase so that the bracket can be removed and attached without the use of tools. The handle protrusion is along the outside of the bracket and is deep and wide enough to give purchase to aid in attaching and removing the bracket. In some embodiments the bracket is manufactured without the handle protrusions, it is possible to attach and remove the bracket without these handle protrusions, however the straight sides increase the difficulty of attaching the brackets. To increase the ability to attach and remove the brackets, the brackets are manufactured with handle protrusions 802.

In another embodiment the attachment bracket 800 is made from metal, such as steel or aluminum. The metal is cast such that the 'nail head' protrusions and bracket are all one piece. In another embodiment the 'nail head' protrusions are riveted to the bracket. In another embodiment the bracket has openings that correspond to the channel wall openings through which pins are inserted.

The keyhole attachment on the light 804 has benefits in that it does not require the use of the overhead channel to be secured to a wall, ceiling or other surface. If desired two nails or screws could be affixed to the desired surface and the light could be attached thereto.

The attachment bracket 800 is particularly well suited for lightweight components and components subjected to minimal pulling forces, for heavier objects and those that experience pulling forces a stronger connection is necessary. The overhead channel 900 with wall channel openings 901 accomplishes the preferred embodiment for the attachment of heavier components such as a winch 902 with the winch 902 having a metal bracket 903 constructed into the winch. The metal bracket has bracket openings 904 which correspond to the overhead channel wall openings 901 pins 905 are inserted through these openings. It will be obvious to one skilled in the art that various types of pins will function in this role, spring pins are particularly well suited for maintaining the ease of use of the overhead mounting system, as they can be inserted and removed without the use of additional tools. Cotter pins are also acceptable though generally a more involved removal as the ring must be removed to remove a cotter pin. In general, a hardened pin will be preferred, however pins of various manufacture are acceptable to use. In some embodiments bolts and nuts can be used to secure the components. Though necessitating the use of tools, using bolts and nuts to secure the components leads to a very secure attachment.

Figure 9A:
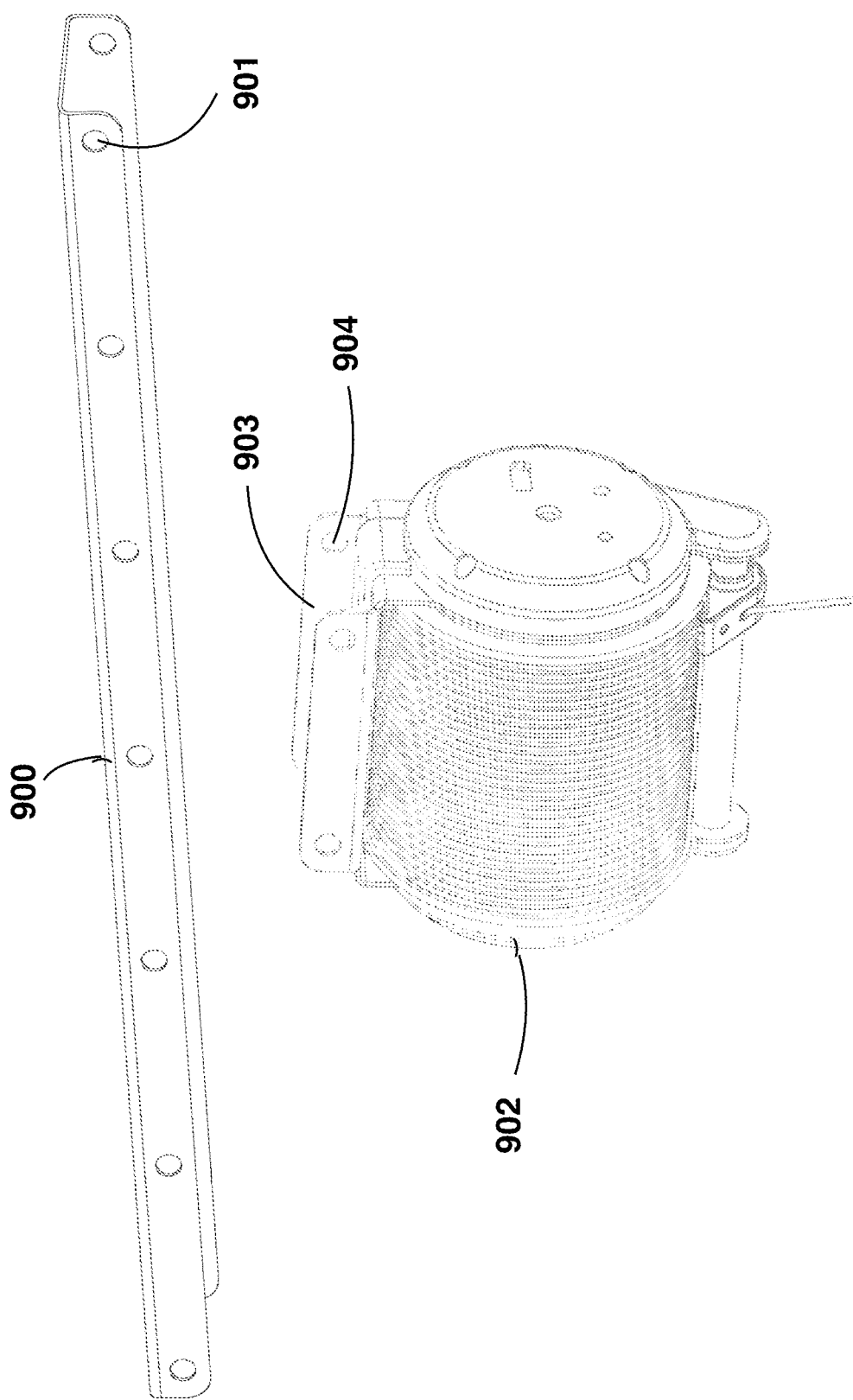
FIGS. 9A-C are winches attached to the overhead channel and metal brackets
Figure 9B:
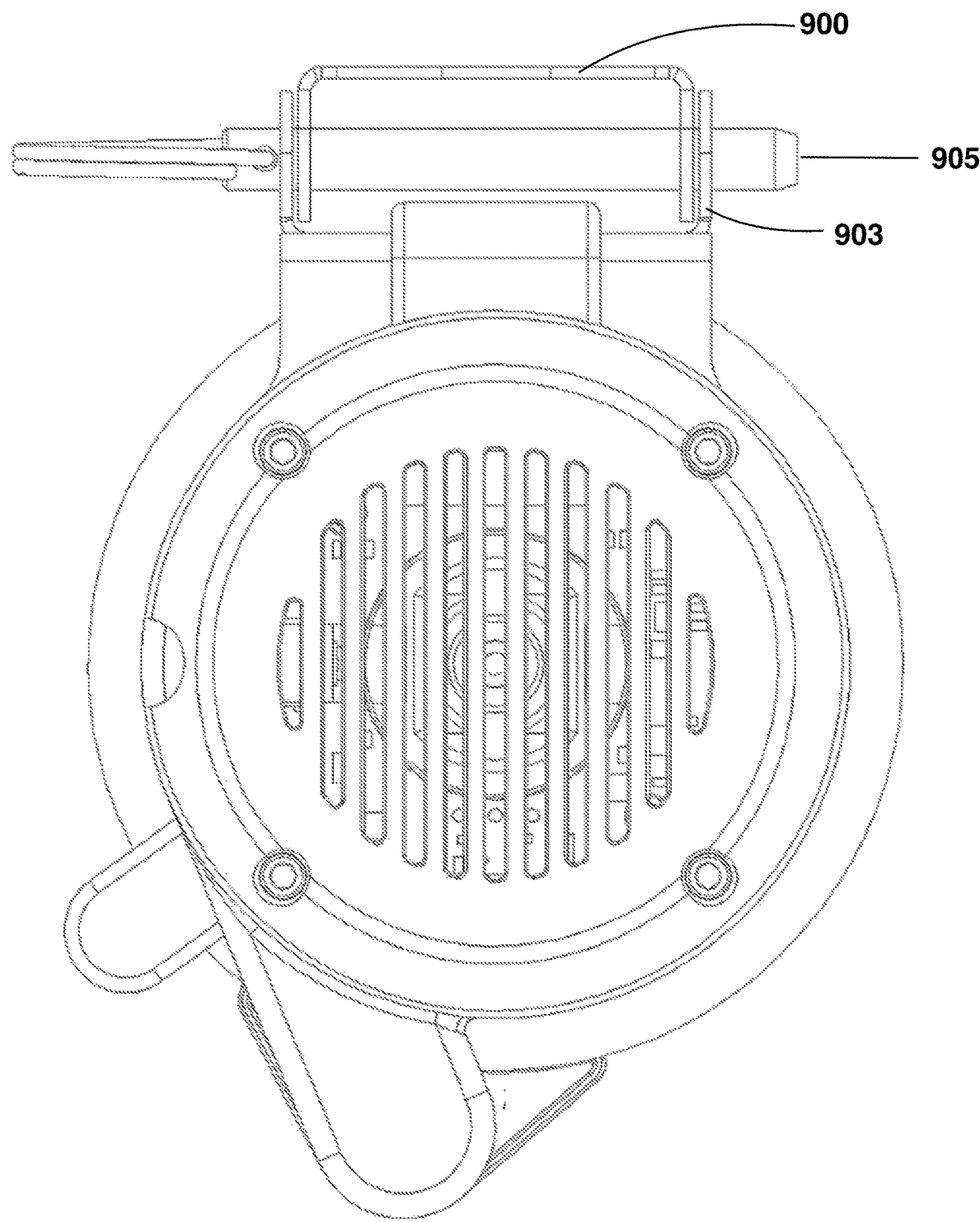
Figure 9C:
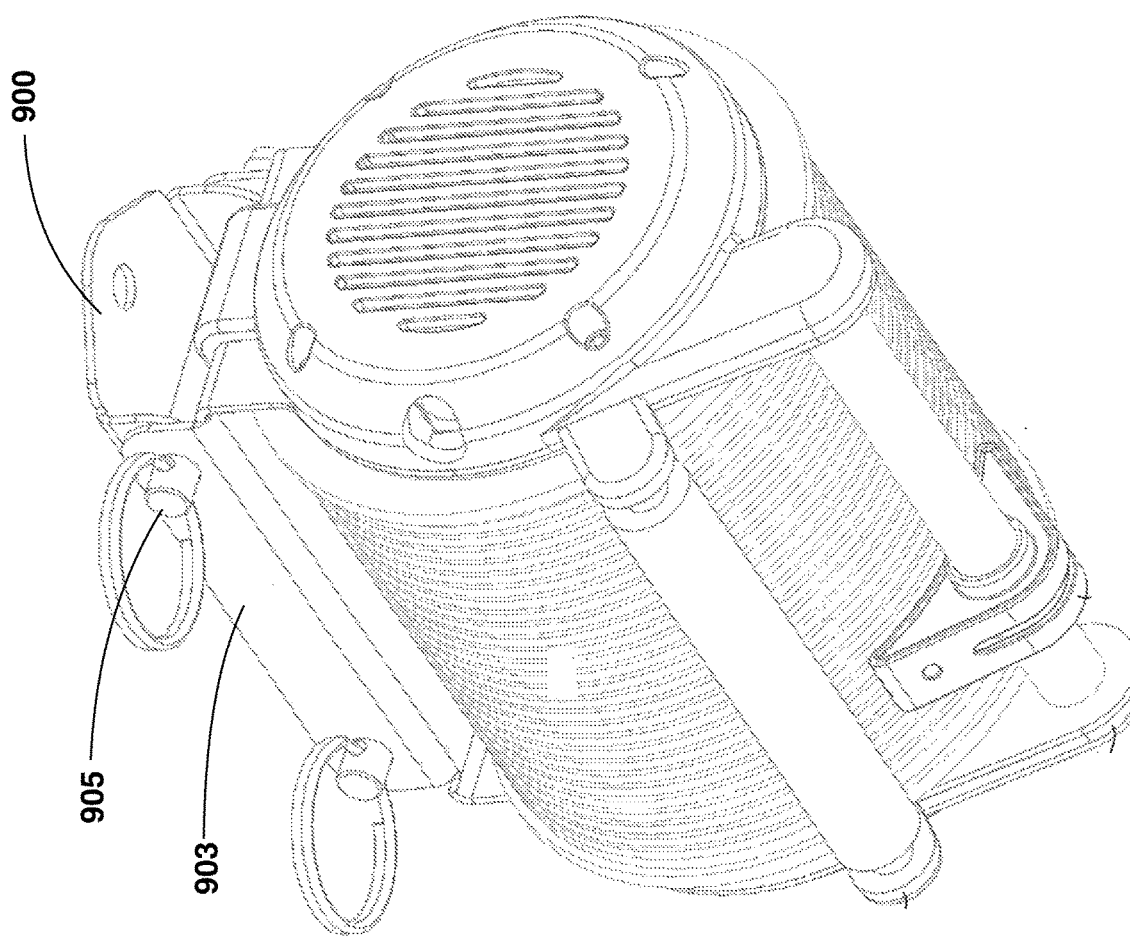

Turning to FIG. 9B the winch 903 is attached to the overhead channel 900 by pins 905 passing through the openings in the metal bracket 903 and the corresponding openings in the overhead channel 900. Each individual pin 905 passes through both sides of the metal bracket 903 and the overhead channel 900 and the space between the channel walls. In certain embodiments the pins are tapered at one end. Generally, the overhead mounting track is mounted close to the ceiling in a garage, this makes access difficult, tapering one end of the pins that secure the brackets to the overhead track decreases the difficulty in finding the openings for the end of the pins.

All patents and published patent applications referred to herein are incorporated herein by reference. The invention has been described with reference to various specific and preferred embodiments and techniques. Nevertheless, it is understood that many variations and modifications may be made while remaining within the spirit and scope of the invention.

What is claimed is:

1. An overhead mounting system comprising:
   a channel having a base and side walls, the base comprising a plurality of mounting openings for mounting to a surface and the walls having a plurality of attachment openings for securing one or more components;
   wherein the components are removable and can be attached at different points along the channel and;
   wherein the channel is configured to accommodate attachment for multiple and diverse components, which have different dimensions, masses, pulling forces, or power requirements;
   wherein the components are secured to the channel with removable attachment brackets;
   wherein each bracket comprises a base and two sides;
   wherein each of the brackets comprises a handle protrusion on each side of the bracket.

2. The overhead mounting system of claim 1, wherein the mounting system is capable of being lengthened by attaching a second channel with a connector.

3. The overhead mounting system of claim 1, wherein the bracket comprises two nail head protrusions on the base of the bracket.

4. The overhead mounting system of claim 3, wherein components attach to the nail head protrusions on the bracket through keyhole attachments.

5. The overhead mounting system of claim 1, wherein the attachment bracket contains openings corresponding to the openings in the wall of the channel.

6. The overhead mounting system of claim 5, comprising pins for securing the attachment bracket to the channel, through the corresponding openings.

7. The overhead mounting system of claim 6, wherein the pins are tapered at one end.

8. The overhead mounting system of claim 1, wherein the channel is covered in a protective coating.

9. An overhead mounting system comprising:
- a channel having a base and side walls, the base comprising a plurality of mounting openings for mounting to a surface and the walls having a plurality of attachment openings for securing one or more components;
- wherein the components are removable without tools and can be attached at different points along the channel and;
- wherein the channel is configured to accommodate multiple and diverse components, which have different dimensions, masses, pulling forces, or power requirements
- wherein the components are secured to the channel with removable attachment brackets;
- wherein each bracket comprises a base and two sides;
- wherein each of the brackets comprises a handle protrusion on each side of the bracket.

10. The overhead mounting system of claim 9, wherein the mounting system is capable of being lengthened by attaching a second channel with a connector.

11. The overhead mounting system of claim 9, wherein the bracket comprises two nail head protrusions on the base of the bracket.

12. The overhead mounting system of claim 11, wherein components attach to the nail head protrusions on the bracket through keyhole attachments.

13. The overhead mounting system of claim 9, wherein the bracket contains openings corresponding to the openings in the wall of the channel.

14. The overhead mounting system of claim 13, comprising pins for securing the attachment bracket to the channel, through the corresponding openings.

15. The overhead mounting system of claim 13, wherein the pins are tapered at one end.

16. The overhead mounting system of claim 9, wherein the channel is covered in a protective coating.

* * * * *